United States Patent
Hovdal et al.

(10) Patent No.: US 9,661,037 B2
(45) Date of Patent: *May 23, 2017

(54) METHOD, APPARATUS, AND COMPUTER READABLE MEDIUM FOR TRANSFERRING A COLLABORATION SESSION

(71) Applicant: CISCO TECHNOLOGY, INC., San Jose, CA (US)

(72) Inventors: Gaute Hovdal, Oslo (NO); Ivan Marius Kristiansen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,568

(22) Filed: Apr. 9, 2014

(65) Prior Publication Data

US 2014/0217167 A1    Aug. 7, 2014

Related U.S. Application Data

(63) Continuation of application No. 13/189,907, filed on Jul. 25, 2011, now Pat. No. 8,738,699.

(Continued)

(30) Foreign Application Priority Data

Jul. 26, 2010   (NO) .................................. 20101063

(51) Int. Cl.
*G06F 5/00*        (2006.01)
*G06F 15/16*       (2006.01)
(Continued)

(52) U.S. Cl.
CPC .... *H04L 65/1083* (2013.01); *G06F 17/30879* (2013.01); *G06K 7/1095* (2013.01);
(Continued)

(58) Field of Classification Search
CPC ....... H04L 12/58; H04L 67/146; H04L 67/22; H04L 12/2812; H04L 63/08;
(Continued)

(56) References Cited

U.S. PATENT DOCUMENTS 6,760,324 B1 * 7/2004 Scott ....................... H04L 45/02
370/352
8,738,072 B1 * 5/2014 Messerian ........... H04M 1/7253
348/14.02

(Continued)

FOREIGN PATENT DOCUMENTS

| JP | 2004-229270 A | 8/2004 |
|---|---|---|
| JP | 2006-268261 A | 10/2006 |
| JP | 2009-77120 A | 4/2009 |

OTHER PUBLICATIONS

International Search Report dated Mar. 1, 2011, in Norwegian Patent Application No. 2010/1063 filed Jul. 26, 2010.

(Continued)

*Primary Examiner* — Ruolei Zong
(74) *Attorney, Agent, or Firm* — Lempia Summerfield Katz LLC

(57) ABSTRACT

A method for transferring a collaboration session from a handheld device to a multimedia endpoint by encoding session data for the collaboration session and/or instructions into an optically machine-readable representation of data, displaying the data on a display of the handheld device, and optically providing the data to a multimedia endpoint the collaboration session is to be transferred to. The multimedia endpoint may send a message to a server upon detecting the data, causing the server to transfer the collaboration session, based on the session data in the message. Alternatively, the multimedia endpoint establishes a session with another multimedia endpoint based on the instructions and/or session data.

14 Claims, 6 Drawing Sheets

Related U.S. Application Data

(60) Provisional application No. 61/367,482, filed on Jul. 26, 2010.

(51) Int. Cl.
*H04L 29/06* (2006.01)
*G06K 7/10* (2006.01)
*H04M 3/56* (2006.01)
*H04M 3/58* (2006.01)
*G06F 17/30* (2006.01)
*H04M 3/42* (2006.01)

(52) U.S. Cl.
CPC ............... *H04M 3/56* (2013.01); *H04M 3/58* (2013.01); *H04M 3/42263* (2013.01); *H04M 2201/20* (2013.01); *H04M 2203/2094* (2013.01)

(58) Field of Classification Search
CPC ..... H04M 2203/2094; H04M 3/42263; H04M 3/58; H04M 3/567
USPC ........ 709/204, 205–207, 227–229, 238, 239, 709/245, 246; 379/88.11, 88.13, 88.14; 348/14.08, 14.11, 14.12, E7.079, E7.081
See application file for complete search history.

(56) References Cited

U.S. PATENT DOCUMENTS

| 2004/0105420 | A1 | 6/2004 | Takeda et al. | |
| 2005/0031092 | A1* | 2/2005 | Umemura et al. | 379/88.13 |
| 2005/0047389 | A1* | 3/2005 | Bond et al. | 370/351 |
| 2007/0071203 | A1 | 3/2007 | Boyer et al. | |
| 2010/0311326 | A1* | 12/2010 | Klabunde et al. | 455/41.1 |

OTHER PUBLICATIONS

Norwegian Search Report dated Feb. 4, 2011 in Norwegian Patent Application No. 20101063 filed Jul. 26, 2010.

International Search Report issued Oct. 20, 2011, in PCT/NO2011/000198.

Extended European Search Report mailed Jan. 3, 2014, in European Patent Application No. 11812824.8.

Alapetite, "Dynamic 2D-barcodes for multi-device Web session migration including mobile phones," Personal and Ubiquitous Computing (2010) 14:45-52, Apr. 2, 2009, Springer London.

\* cited by examiner

METHOD, APPARATUS, AND COMPUTER READABLE MEDIUM FOR TRANSFERRING A COLLABORATION SESSION

CROSS REFERENCE TO RELATED APPLICATIONS

The present application is a continuation application of and claims the benefit of priority under 35 U.S.C. §120 from U.S. application Ser. No. 13/189,907, filed Jul. 25, 2011, which is a non-provisional application of U.S. provisional Application No. 61/367,482, filed Jul. 26, 2010, and which claims priority under 35 U.S.C. §119 to Norwegian patent application NO20101063, filed Jul. 26, 2010, the entire contents of each of which is incorporated herein by reference.

TECHNICAL FIELD

The exemplary embodiments described herein relate to transferring a collaboration session from a handheld device to a multimedia endpoint.

BACKGROUND

Conventional videoconferencing systems comprise a number of end-points communicating real-time video, audio and/or data (often referred to as "duo video," which is a feature that allows the codec to send two live video streams simultaneously, allowing the viewer to see the person speaking and additional content) streams over and between various networks such as WAN, LAN and circuit switched networks.

A number of videoconference systems residing at different sites may participate in the same conference, most often, through one or more MCU's (Multipoint Control Unit) performing, for example, switching and mixing functions to allow the audiovisual terminals to intercommunicate properly.

Video conferencing systems presently provide communication between at least two locations for allowing a video conference among participants situated at each station. Conventionally, the video conferencing arrangements are provided with one or more cameras. The outputs of those cameras are transmitted along with audio signals to a corresponding plurality of displays at a second location such that the participants at the first location are perceived to be present or face-to-face with participants at the second location.

Video conferencing systems are becoming increasingly common, especially in the desktop space. Landline telephones are exchanged with desktop video conferencing systems which may operate both as IP phones and video conferencing systems.

Each Video conferencing system has a unique identifier (or address) which is used when someone wishes to call a certain video conferencing system. For example, a video conferencing system operating on H.320 (ISDN) may have a unique phone number, and a Video conferencing system operating on H.323 (IP) may have a unique Uniform Resource Identifier (URI) or IP-address. This allows a user and his/her video conferencing system to be associated with one unique identifier, much like traditional telephone systems and telephone numbers.

However, the unique identifier is associated with the video conferencing system, so the user is only reachable at the physical location of the video conference system.

In an office environment this causes limitations in accessibility since people often are on the move, e.g. attending meetings, workgroups, etc. A user may also have several equally important work locations such as the office, the lab, common creative workspace, etc. Each location may have a video conference system. Hence, since each video conference system has its own unique identifier, and the caller usually does not know the physical location of the person he/she is trying to reach, the caller must either try to call all the locations he/she thinks the person may be or he/she must try to call back at a later stage.

Another problem with location-bound telecommunication equipment is the disturbance it may cause to immediate surroundings. Speech has been found to be the most annoying sound source in open plan offices, and the most distracting speech originates from the closest workstation. Since desktop video conferencing systems are more or less stationary devices, it is impossible to walk to a more private area to continue a call without first disconnecting the call and then reestablish the call at a different location.

SUMMARY

A first exemplary embodiment is a method including: receiving, at a collaboration server, a session request from a first multimedia endpoint addressed to a user; establishing a first session between the first multimedia endpoint and a handheld device associated with the user in a user database; providing session data associated with the first session to a second multimedia endpoint by encoding the session data into a barcode image, displaying the barcode image on a display of the handheld device, and retrieving and decoding the barcode image at the second multimedia endpoint using a camera associated with the second multimedia endpoint; receiving, at the collaboration server, a barcode image detection message from the second multimedia endpoint; and in response to the receiving of the barcode image detection message, transferring the first session to the second multimedia endpoint, based on the session data associated with the first session and an address of the second multimedia endpoint included in the barcode image detection message.

A second exemplary embodiment includes a method including: receiving, at a collaboration server, a session request from a first multimedia endpoint addressed to a user; establishing a first session between the first multimedia endpoint and a handheld device associated with the user in a user database; providing, to a second multimedia endpoint, one or more of session data associated with the first session or at least one computer executable instruction, the providing including encoding the one or more of session data associated with the first session or the at least one computer executable instruction into a barcode image, displaying the barcode image on a display of the handheld device, retrieving and decoding the barcode image at a second multimedia endpoint using a camera associated with the second multimedia endpoint; and sending a session request from the second multimedia endpoint to the first multimedia endpoint based on the decoded one or more of the session data associated with the first session or the at least one computer executable instruction.

A third exemplary embodiment includes a collaboration server including: a memory that stores a user database; a processor; a session management module configured to receive, in conjunction with the processor, a session request, addressed to a user, from a first multimedia endpoint and establish a first session between the first multimedia endpoint and a handheld device associated with the user based on the user database; and a barcode management module configured to encode, in conjunction with the processor, at least one of session data associated with the first session or at least one computer executable instruction into a barcode image, and distribute the barcode image to the handheld device on an occurrence of a predefined event.

A fourth exemplary embodiment includes a multimedia endpoint including: a processor; at least one camera; and a barcode reader unit configured to analyze images from the camera to detect a barcode image displayed on a handheld device, and decode the barcode image to extract at least one of session data or an instruction, and send a barcode image detection message to a collaboration server when a barcode image is detected and decoded, the barcode image detection message including at least parts of the barcode data and the address of the multimedia endpoint, wherein if an establish session instruction is detected in the barcode image, barcode reader unit instructs the processor to establish a session with another multimedia endpoint identified in the session data.

BRIEF DESCRIPTION OF THE DRAWINGS

In order to make the invention more readily understandable, the discussion that follows will refer to the accompanying drawings, wherein.

DETAILED DESCRIPTION OF EMBODIMENTS

In the following, various exemplary embodiments are described by referring to the accompanying drawings. However, people skilled in the art will realize other applications and modifications within the scope of the invention as defined in the enclosed claims.

Figure 1:
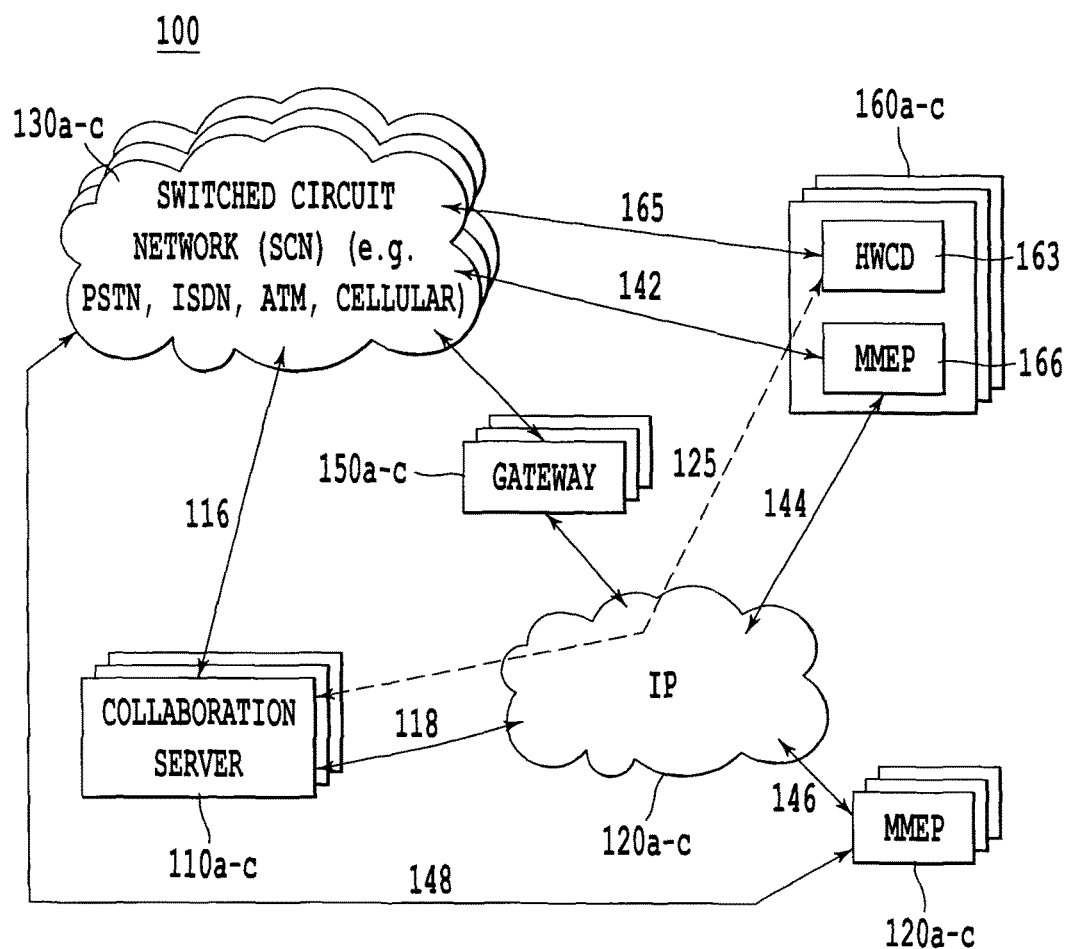
FIG. 1 is a block diagram illustrating the relevant elements of a multimedia conferencing system.

FIG. 1 is a block diagram illustrating the topology of an exemplary audio and/or multimedia conferencing system 100 that may include: one or more collaboration servers (CS) 110a-c; a plurality of users 160a-c that use multimedia endpoints 166 and handheld wireless communication devices (HWCD) 163; one or more Switched Circuit Networks (SCNs) 130a-c; and one or more Internet Protocol (IP) Networks (IPNs) 120a-c. Each user 160a-c may have a multimedia endpoint (MMEP) capable of communicating over Switched Circuit Networks (SCNs) 130a-c via connection 142 or over Internet Protocol Networks (IPNs) 120a-c via connection 144. In addition, each user 160a-c may have a handheld wireless communication device (HWCD) 163 capable of communicating over Switched Circuit Networks (SCNs) 130a-c via connection 165, e.g. cellular networks such as GSM. System 100 may also comprise other multimedia endpoints (MMEP) 120a-c capable of communicating over a Switched Circuit Networks (SCNs) 130a-c via connection 148 or over Internet Protocol Networks (IPNs) 120a-c via connection 146, e.g. shared multimedia endpoints such as meeting room systems.

Hereafter, the handheld wireless communication device (HWCD) 163 will be referred to as handheld device 163.

Optionally, handheld device 163 may have a computing section (data section) that communicates with collaboration server 110a-c via a connection over IPN 120a-c.

Optionally, computing section (data section) may communicate with collaboration server 110a-c via a connection over a wireless network, such as 2G, 3G, 4G etc.

Data and commands communicated between collaboration server 110a-c and multimedia endpoints 166/120 may be accomplished via connections 118 and 146, or 118 and 144 respectively over Internet Protocol Networks 120a-c, or over 116 and 142 over SCN 130a-c. Although three units of each item are shown in FIG. 1, there may be fewer or more than three of each item in an actual conferencing system. There is also no requirement that the number of each item be the same as the number of any other item.

Switched Circuit Networks 130a-c may be a PSTN, an ISDN, an ATM network, a cellular network or any combination thereof. Audio or multimedia endpoint 166 and 120 may provide speech only (e.g., analog telephone, cellular or IP phone), speech and data, speech and video, or speech, data and video communications or any combination thereof.

System 100 may comprises one or more gateways 150a-c for facilitating communication between MMEP 166 and HWCD 163 over connection 144 and 165 respectively, or between MMEP 120 and HWCD 163 over connection 146 and 165 respectively, or between MMEP 166 and HWCD 163 over connection 142 and 165 respectively.

Real-time communication over Switched Circuit Networks (SCN) 130a-c may be based on International Telecommunication Union (ITU) standards such as H.320, H.321, and H.324, which are hereby incorporated by reference as they existed on Jul. 26, 2010. SCN 130a-c may comprise gateways (not shown in the drawings) for facilitating communication between different networks. Real-time communication over Internet Protocol Networks (IPN) 120a-c may be based on ITU standards (e.g., H.323), or on Internet Engineering Task Force's Session Initiation Protocol (SIP) standard, which are incorporated herein by reference as they existed on Jul. 26, 2010. Although not shown, IPN 120a-c may comprise gateways, gatekeepers, soft switches and other network devices. Moreover IPN 120a-c may include corporate intranet having routers, firewalls, etc. IPN 120a-c may run over physical networks such as those included in SCN 130a-c.

One or more of user's 160a-c use a handheld device 163, such as a PDA, a cellular phone, a tablet, a cellular PDA, or any other device of similar function and/or technical sophistication. Handheld device 163 at least comprises a display capable of reproducing text and images. Handheld device 163 may comprise a C-series codec (see, for example Tandberg's C20, C40, C60, and C90 codecs) and audio or audio/video section. Some handheld devices 163 may not include an audio/video section. Optionally, the computing section of the handheld device may be connected over a wireless network, such as 2G, 3G, 4G etc, or an Internet Protocol (IP) based network 120a-c, and may communicate over an Intranet or over the Internet with collaboration server 110a-c over connection 125. The Connection 125 may be a common connection such as serial connection RS232, a wireless connection based on Bluetooth protocol, an Infra Red (IR) connection, an IP connection over a LAN or the Internet, or a cellular phone connection such as GSM network, 3G network etc. The physical connection of an IP connection 125 may run over connection 165 and SCN 130a-c toward the IP network 120a-c.

According to one embodiment of the invention, the computing section (among other tasks and applications) preferably runs a software program (or application) that can be used for displaying a barcode image (ID tag) on a display of the handheld device 163. Computing section may communicate over IPN 120a-c with an IP server such as collaboration server 110a-c.

According to another exemplary embodiment, the HWCD 163 may comprise short-range high frequency wireless communication technology which enables the exchange of data between devices over about a 10 centimeter distance, such as Near Field Communication (NFC). According to this embodiment, the multimedia endpoints 166 and 120 may also comprise similar communication technology, allowing the handheld devices 163 and the multimedia endpoints 166/120 to exchange data when they are brought within 0-10 centimeters of one another.

Collaboration Servers 110a-c, among other tasks and applications, may run a software program that manages one or more data collaboration sessions with or without multimedia between one or more of user's 160a-c handheld devices 163 and/or multimedia endpoints 166, and or multimedia endpoints 120. Collaboration server 110a-c may be installed, for example, in an Intranet of a corporation, or may be installed in a multimedia operator's premises. Collaboration server may constitute a portion of a video conferencing network device, such as a multipoint control unit, a call control unit, a gateway, a gatekeeper, etc. A detailed description of collaboration server 110a-c and its operation is disclosed below with respect to FIG. 2.

Figure 2:
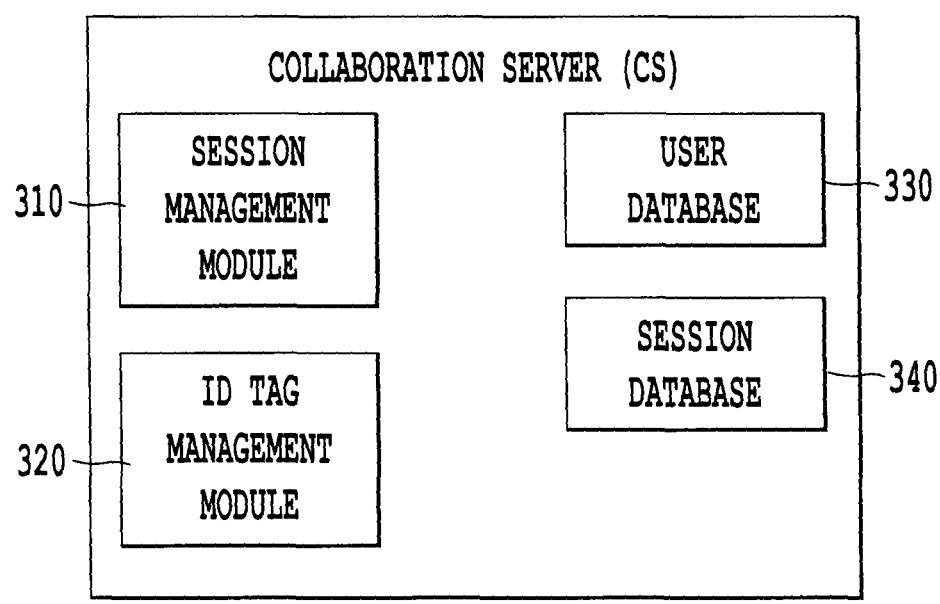
FIG. 2 is a block diagram illustrating the relevant elements of a collaboration server (CS) operative according to an exemplary embodiment described herein.

An exemplary embodiment of Collaboration server 110 is shown in FIG. 2. Collaboration server 110 may comprise a session management module (SMM) 310, a barcode (or ID tag) management module (IDTMM) 320, a user database (UDB) 330 and a session database (SDB) 340.

Session management module 310 communicates between the internal modules and/or databases 330/340 of collaboration server 110 and different destinations over one or more IP networks 120a-c (FIG. 1). Exemplary destinations include a plurality of handheld devices 163 (FIG. 1), a plurality multimedia endpoints 166 and 120 (FIG. 1), one or more multipoint control units (not shown), etc. Session management module 310 is configured to at least establish, transfer and terminate two-party or multiparty sessions consisting of one or several media streams.

The session management module may manage a user database 330 of user parameters for all users in a domain. The user parameters may comprise, but are not limited to, user ID (or user name), one or more endpoint addresses or dial-up numbers (multimedia endpoints, handheld devices, etc.), and optionally a list of prioritized endpoint addresses, etc, for each user. Optionally, the user parameters also comprise an image, more specifically the user parameters may also comprise an ID tag (or barcode image), e.g. a barcode such as a linear barcode or a data matrix code (2D barcode or QR code).

The session management module 310 may manage a session database of session parameters for ongoing sessions and terminated sessions between two or more clients (or endpoints), such as multimedia endpoints, handheld devices, gateways, MCU, etc. The session parameters include, but are not limited to, a session ID, client (or endpoint) addresses (such as IP addresses, dial-up numbers, etc), and communication standards (H.320, H.324, SIP, H.323, etc.) of each session.

A session request (or session invite) from a multimedia endpoint, addressed to a domain controlled by the CS 110, is routed to the CS 110 and handled by the session management module 310. If the session request is addressed to one or more users, e.g. the session request may be addressed to User2@company.com, the SMM 310 may retrieve endpoint address(es) associated with the one or more users from an appropriate user database 330, and forward the session request to the appropriate endpoint. If the session request is addressed to one or more endpoints, e.g. the session request may be addressed to User2.office@company.com, the SMM 310 forwards the session request to the identified endpoint. The request is sent from a multimedia endpoint, e.g. a multimedia endpoint belonging to a User1. The session request comprises at least the address of the multimedia endpoint of User1 e.g. User1.office@company.com. Upon receiving the request, SMM 310 may then decide whether the request is for a point-to-point session, a gateway session, or a multipoint session based on the connection parameters of the users and the number of users in the list.

If the session request is addressed to one or more users, SMM 310 retrieves a multimedia endpoint address or dial-out number for an endpoint (e.g. MMEP 160/120, handheld device 163, etc) from the user parameters for each listed user in user database 330. For example, User2 may, in the user database 330, have a multimedia endpoint 166 with the address User2.office@company.com associated as the preferred endpoint to receive a collaboration session.

In one embodiment the user parameters of user database 330 only have one default endpoint address or dial-out number (such as a cellular telephone number) of a handheld device 163 associated for each user.

In another embodiment the user parameters of user database 330 may have several multimedia endpoint addresses and/or dial-out numbers (such as cellular telephone numbers) of the handheld devices 163 listed for each user. Further, SMM 310 may optionally comprise a call logic module (CLM) (not shown). The CLM allows a user to create a prioritized list of multimedia endpoint and handheld devices, and store the prioritized list as user parameters in the user database 330. In such a case, when CLM receives a session request (or invite) to a user, the session request is first routed to the one or more endpoint's (e.g. multimedia endpoints or handheld devices) being configured to have the highest priority. If the session is not accepted within a predefined time, the session is routed to the one or more endpoints (e.g. multimedia endpoints or handheld devices) having the second highest priority. This continues until the prioritized list is exhausted or the session is accepted or rejected.

According to one embodiment, if it is determined that the session is a multipoint session, then SMM 310 would retrieve endpoint addresses (if not provided) from the user database 330, select an appropriate multipoint control unit (MCU) and send the parameters of the conference to that MCU. These parameters comprise the addresses and/or dial out numbers of endpoints for the listed users that the MCU is asked to establish a session with. Some of the dial-out numbers can be cellular telephone numbers of the handheld devices 153 that belongs to one or more users on the list.

If the requested session is a point-to-point session addressed to a second user, e.g. User2, from a first multimedia endpoint owned by a first user, e.g. User1, SMM 310 may send a session request (or invite) to a second multimedia endpoint associated with the second user (e.g. User2) in the user database 330. If the second multimedia endpoint accepts the session, the SMM 310 establishes a collaboration session between the first and second multimedia endpoints, and stores the session parameters in the session database 340.

The multimedia endpoints may comprise a transfer call function. The transfer call function may be activated by the user in various ways; by pushing a physical button on the multimedia endpoint, entering a code on a keypad, through a graphical user interface using a keypad or a touch screen, voice activated command, etc. When the transfer call function is activated the multimedia endpoint sends a transfer call command to the collaboration server 110 over a IP network 120*a-c* or a switched circuit network 130*a-c*. One parameter of the transfer call command is the address of the multimedia endpoint sending the transfer call command. Upon receiving a transfer call command, the SMM 310 is configured to transfers the session to another endpoint, based on parameters in the transfer call command and/or parameters in the user database 330 and/or parameters in the session database 340.

According to one embodiment, upon receiving a transfer call command from an multimedia endpoint 166/120, the SMM 310 is configured to transfer the session (session ongoing with said multimedia endpoint 166/120) to a handheld device associated with the user (the user of the multimedia endpoint 166/120 sending the transfer call command) in the user database, based on parameters in the user database and/or parameters in the transfer call command and/or the session database. If the session is accepted by the handheld device, SMM 310 terminates communication to/from the multimedia endpoint and establishes a session with the handheld device. The session continues, uninterrupted, between the multimedia endpoint of User 1 and handheld device of User2.

In one embodiment the dial-out number of the target handheld device (the handheld device to which the session shall be transferred) is stored in the user parameters in the user database.

In one embodiment the dial-out number of the target handheld device is a parameter of said transfer call command.

According to another embodiment, if a user (e.g. User2 above) has given a handheld device top priority in the call logic module, the SMM 310 will establish a session, addressed to that user, to a handheld device directly.

When a session is established between a multimedia endpoint and a handheld device via the MSS 310, either by transfer or directly, the handheld device displays a unique ID tag. The unique ID tag may be an optical machine-readable representation of data. The ID tag can be read from a digital image by imaging hardware (i.e., a camera or an optical reader) and its associated software. The ID tag may be a barcode image; a linear or 1D (1 dimensional) barcode or a 2D (2 dimensional) barcode (also referred to as matrix codes), such as QR code, Aztec code, barcode, High Capacity Color Barcode, PDF417, semacode, Shotcode, Microsoft tag, etc. The parameters encoded in the ID tag (or barcode image) may comprise, but are not limited to, the user name (or user ID) of the user of the handheld device, the session ID of the session the user of the handheld device is presently in, Endpoint instructions (instructions for the endpoint), etc.

According one embodiment, the CS 110 comprises an ID tag management module IDMM 320.

In, one embodiment, the IDMM 320 generates a unique ID tag (or barcode image) for each user in the user database and associatively stores the unique ID tag as a user parameter in the user database. On predefined events, the ID tag is distributed to the user's handheld devices. Such predefined event may comprise; on request, when a new user is added to the user database, on certain time intervals, etc. The ID tags may be distributed in the form of an electronic business card, such as vcard. The electronic business card comprises the ID tag and the address/dial-up number of a gateway 150*a-c* used for facilitating communication between MMEP 166/120 and HWCD 163. The handheld device may store the electronic business card automatically in the address book (or contact list) of the handheld device. Alternatively, the handheld device prompts the user with a choice to store the electronic business card or not. Most handheld devices for receiving phone calls (such as cell phones and smart phones) are factory configured to display an image associatively stored with a phone number in the address book, when the phone receives a call from that phone number. Hence, according to this embodiment, the handheld device displays a ID tag when the SMM 310 routes a session to the handheld device. If more than one gateway is present in the network, the SMM 310 may send one electronic business card for each gateway, or one electronic business card with one ID tag and several gateway dial-up numbers. Each electronic business card may comprise the same or different ID tags. The ID tags may be distributed to the handheld device using a standard or proprietary protocol over TCP/IP or 3G.

According to another embodiment, the IDMM 320 is configured to generate and send an ID tag to the handheld device when a session request is sent to that handheld device or when a session is accepted or when a session is established with that handheld device. The IDMM may send the ID tag as an attachment to a message, such as Multimedia Messaging Service (MMS), or an email, or a vcard, etc. The ID tags may be distributed to the applications on the handheld devices using a standard or proprietary protocol over TCP/IP or 3G.

According to yet another embodiment, the computing/data section of the handheld device may comprise a first software application. As with one of the previous embodiments the IDMM 320 generates a unique ID tag for each user in the user database and associatively stores said unique ID tag as a user parameter in the user database. On predefined events, the ID tag is distributed to the user's handheld devices. Such predefined event may comprise; on request, when a new user is added to the user database, on certain time intervals, etc. The ID tags may be distributed to the applications on the handheld devices using a standard or proprietary protocol over TCP/IP or 3G. The application is configured to monitor incoming sessions (or calls), and display the ID tag if a session is established or session request is received from one of the gateways 150*a-c* used for facilitating communication between MMEP 166/120 and HWCD 163.

According to yet another embodiment, the computing/data section of the handheld device may comprise a second software application. The IDMM generates a software token for each user in the user database. On predefined events, the ID tag is distributed to the user's handheld devices. Such predefined event may comprise; on request, when a new user is added to the user database, on certain time intervals, etc. The software token is typically a configuration file unique for each user. The file may contain a username, a personal identification number, and a shared secret. The shared secret can be a password, a passphrase, a big number or an array of randomly chosen bytes. The application may generate an ID tag and display the generated ID tag when a call or session request is received from one of the gateways 150*a-c*. The ID tag at least comprises the shared secret.

The multimedia endpoints 166/120 may comprise an ID tag reader module (or barcode reader module) IDRM. The IDRM receives a video stream captured by the multimedia endpoints camera. The IDRM scans the images of the video stream for ID tags (or barcodes), and when an ID tag is detected, the IDRM decodes the ID tag and extracts the data stored in ID tag. The IDRM may comprise barcode reader software capable of reading at least one or more of the 1D and/or 2D barcodes previously mentioned. Barcode reader software for 1D and/or 2D barcodes is well known, and is not discussed in more detail herein. The IDRM is configured to receive instructions encoded in the ID tag, and send control instructions to the multimedia endpoint's 166/130 control unit, based on instructions in the ID tag.

According to one embodiment, upon decoding and validating that the ID tag (or barcode) comprised the correct data, the IDRM is configured to generate a barcode image detection message and send the barcode image detection message to the CS. The barcode image detection message may be distributed to the CS using a standard or proprietary protocol over a Switched Circuit Networks (SCNs) 130*a-c* or over Internet Protocol Networks (IPNs) 120*a-c*. The barcode image detection message comprises a set of control parameters. The control parameters may comprise, but are not limited to, the multimedia endpoint address (e.g. Endpoint URI or IP address or dial-up number) of the multimedia endpoint 166/120 where the ID tag (or barcode) was detected, user ID (stored in ID tag), and optionally Session ID (stored in ID tag).

According to one embodiment, the ID tag (or barcode) may comprise instructions. If the ID tag comprises an establish session instruction, the IDRM is configured to instruct the multimedia endpoint to establish a session with a multimedia endpoint identified in the session data retrieved from the ID tag. If the ID tag does not comprise a establish session instruction, the IDRM sends a barcode image detection message to the CS 110 as described above.

In one embodiment, the control parameters of the ID tag comprises an endpoint instruction. The endpoint instruction is an auto answer instruction, and in response to receiving the auto answer command the IDRM sends an instruction to a control unit of the multimedia endpoint 120/166 causing the multimedia endpoint to enable a one-time auto answer setting, if auto answer in not already enabled. Auto answer is a common configuration on multimedia endpoints. When auto answer is enabled, the multimedia endpoint automatically accepts session request so that a session (or call) can be established between the multimedia endpoint and the session initiator.

In another embodiment the CS is configured to, upon receiving a barcode image detection message from an endpoint, reply to the endpoint with an auto answer instruction instructing the endpoint to enable a one-time auto answer setting. The auto answer instruction may comprise a data string from the received barcode image detection message for security measures.

Upon receiving a barcode image detection message from an endpoint 166/120, the Session management module SMM 310 sends a session request to the multimedia endpoint identified in the barcode image detection message, based on parameters in the barcode image detection message and/or parameters in the session database. If the session is accepted by the multimedia endpoint, the connection to the handheld device is transferred to the multimedia endpoint multimedia endpoint identified in the barcode image detection message. Hence, the connection to the user's handheld device is terminated, and a session is established between the initiating multimedia endpoint and the multimedia endpoint identified in the barcode image detection message. The session initiator will not be disconnected and reconnected during this procedure, allowing for a seamless transfer between endpoints.

According to another exemplary embodiment, the ID tag comprises an establish session instruction. The establish session instruction comprises at least the address or dial-up number of the multimedia endpoint 166/120 that initiated the ongoing session with the handheld device. Upon, detecting and decoding the ID tag, the IDRM instructs the multimedia endpoint to send a session request to the multimedia endpoint identified in the establish session instruction. Optionally, the IDRM may further send an instruction to the CS instructing the CS to terminate the session between the first multimedia endpoint and the handheld device.

Figure 3:
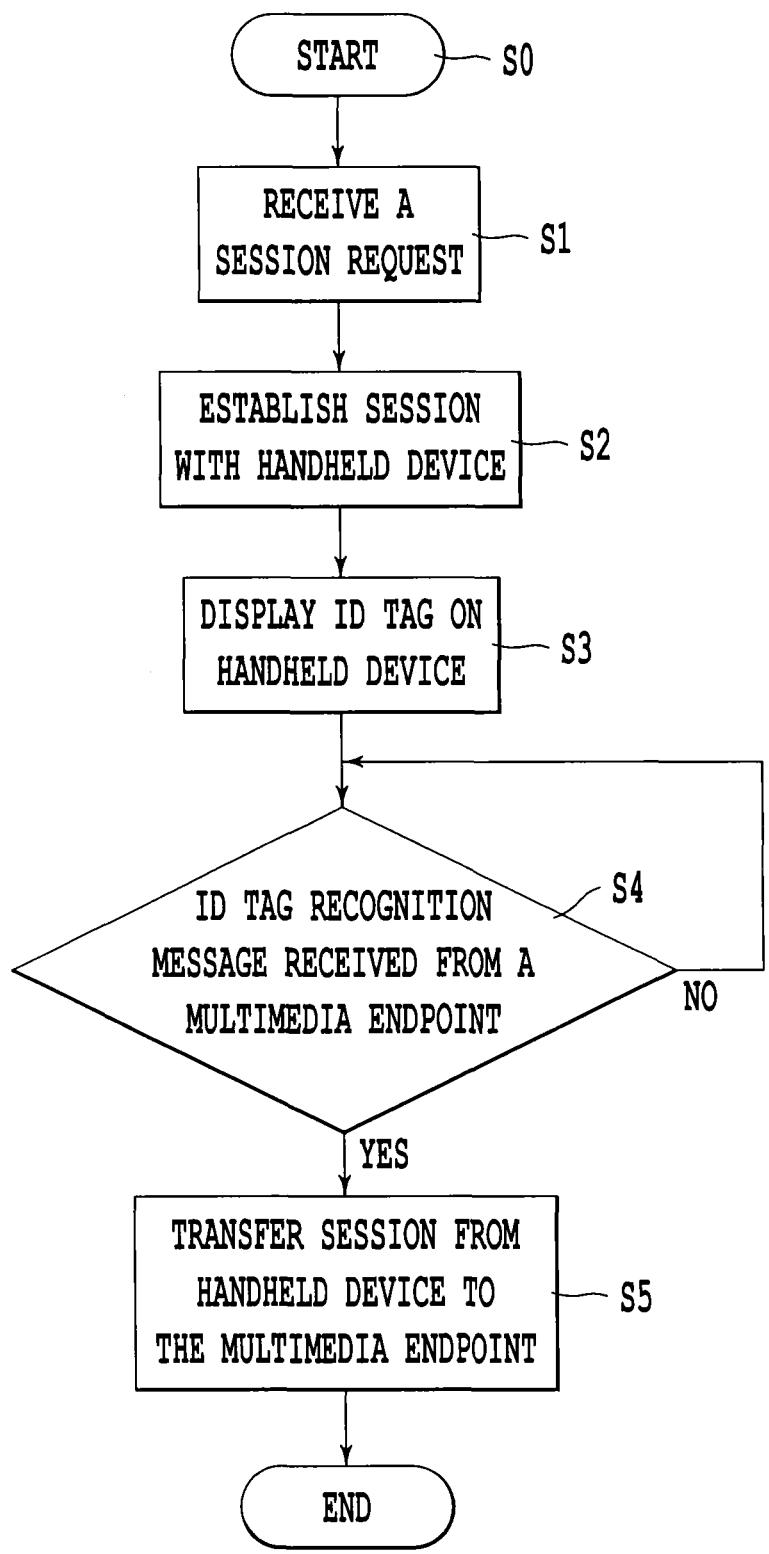
FIG. 3 is a flowchart showing the steps in an exemplary method of transferring a collaboration session.

FIG. 3 is a schematic flow chart illustrating exemplary steps of a method for transferring an ongoing session from one endpoint to another endpoint. More specifically, the method is for transferring an ongoing session from a handheld device to a multimedia endpoint. The method of FIG. 3 is a more seamless and transparent method compared to known methods.

The method starts at the initiating step S0.

In step S1 the CS receives a session request (or call request), from a first multimedia endpoint, addressed to a second user. For example, a first user (e.g. UserY) at EndpointY calls a second user (e.g. UserX) on an address UserX@company.com.

The session request is routed to a handheld device 163 associated with the second user (UserX) in a user database 330. If the session request is accepted by the handheld device 163, a session is established between the first multimedia endpoint (EndpointY) and the handheld device 163 in Step S2. The session may be an audio only session, or the session may comprise audio and video, depending on the capabilities of the handheld device and the configuration of the CS 110. When a session is established, the CS 110 may optionally store a set of session parameters for the session in a session database 340. The session parameters may comprise, but are not limited to, session ID, address or dial-up numbers of the endpoints in the session, User ID (or user name) of the parties in the session, etc.

In one exemplary embodiment, the session request is routed directly to the handheld device.

Figure 4:
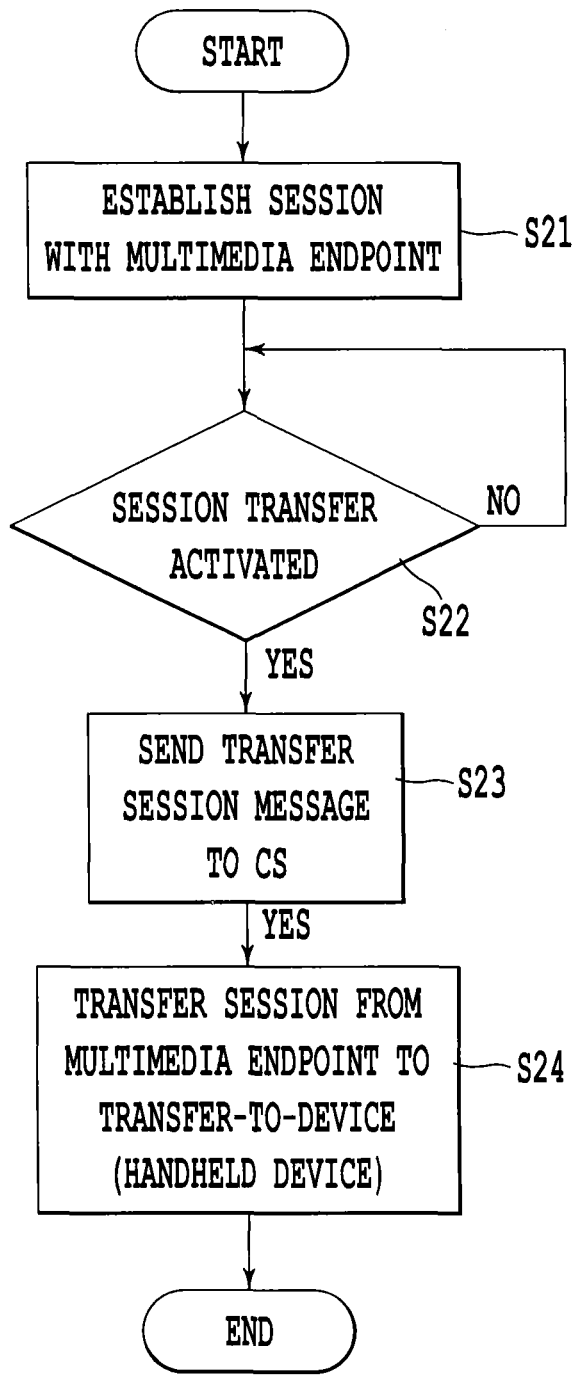
FIG. 4 is a flowchart showing the steps in an exemplary method of transferring a collaboration session.

Step S2 establishes a session with the handheld device. Step S2 may involves directly establishing the session with the handheld device, or may comprise a set of substeps, as shown in the flow diagram in FIG. 4. Upon receiving a session request (S1), the CS may route the session request to a third multimedia endpoint (e.g. EndpontX) associated with the second user in the user database. If the session request is accepted by the third multimedia endpoint, a session between the first multimedia endpoint (e.g. EndpoinY) and the third multimedia endpoint (e.g. EndpointX) is established in step S21. The CS may store a set of parameters for the session in the session database 340 as described above. When the session is established, the process proceeds to step S22, where an inquiry is made regarding whether a session transfer function on the third multimedia endpoint (e.g. EndpointX) is activated. The call transfer function may be activated by pressing a physical button on the multimedia endpoint, or a soft key/menu option in a graphical user interface for the endpoint. If the response to the inquiry is negative, the process returns to step S21. If the response to the inquiry in step S22 is affirmative, the process proceeds to step S23, where the third multimedia endpoint sends a transfer call command to the CS, at least identifying the address of the third multimedia endpoint and/or the User ID (user name) of the second user (user of the third multimedia endpoint). Upon receiving the transfer call command at the CS, the CS looks in the user database 330 if a handheld device is associated as a transfer-to-device as a user parameter for the identified user (e.g. UserX). If the identified user (e.g. UserX) does not have a transfer-to-device registered in the user database, the transfer command (or request) may be rejected, and the session continues on the third multimedia endpoint (e.g. EndpointX). Alternatively, if the identified user (e.g. UserX) does not have a transfer-to-device registered in the user database, the second user (e.g. UserX) is prompted on the third multimedia endpoint (e.g. EndpointX) to enter a dial-up number to which the second user (e.g. UserX) wishes to transfer the call. In the latter case, the dial-up number entered by the user is sent to the CS 110, and the CS 110 stores the dial-up number as a transfer-to-address in the user database 330 as a user parameter for the second user (e.g. UserX). If the second user does have a transfer-to-device registered in the user database 330, or the second user enters a dial-up number on request as described above, the CS transfers the session from the third multimedia endpoint (e.g. EndpointX) to the transfer-to-device (or handheld device) in step S24. Hence, a session is established between the first multimedia endpoint and the handheld device in step S2.

When the handheld device receives the session request, or when the session request is accepted by the handheld device, or the session is established with the handheld device, the handheld device displays an ID tag on the handheld device's display, in step S3.

In an exemplary embodiment, the ID tag is automatically displayed on the handheld device. The handheld device may comprise one or more pre-stored contact or phone book entries. The pre-stored contact or phone book entries comprises at least one or more dial-up numbers (or addresses) of the one or more gateways used by the CS and an ID tag (or an image of the ID tag). Upon receiving a session request from the CS via one of the gateways, the handheld device displays the ID tag which is associatively stored with the phone number of the gateway in the contact list or phone book. Alternatively, an application performing the function described above is running on the handheld device. The automatic display of the ID tag is advantageous since no action is required by the user. Hence, it is user friendly.

In another exemplary embodiment, the handheld device requires input from the user in order to display the ID tag. According to one embodiment, the CS sends a multimedia message to the handheld device when a session is established or session request is routed to or accepted by the handheld device in step S2. The multimedia message at least comprises an ID tag. The multimedia message may be one of: Multimedia Messaging Service (MMS) message, e-mail, v-card, etc. Upon receiving the multimedia message, one or more actions may required from the user in order to display the ID tag on the display, e.g. open the message and/or open the attached ID tag. This approach allows the CS to send an ID tag which is unique to the ongoing session. Hence, security is higher since the ID tag is secret until the user receives it on its handheld device.

Figure 5:
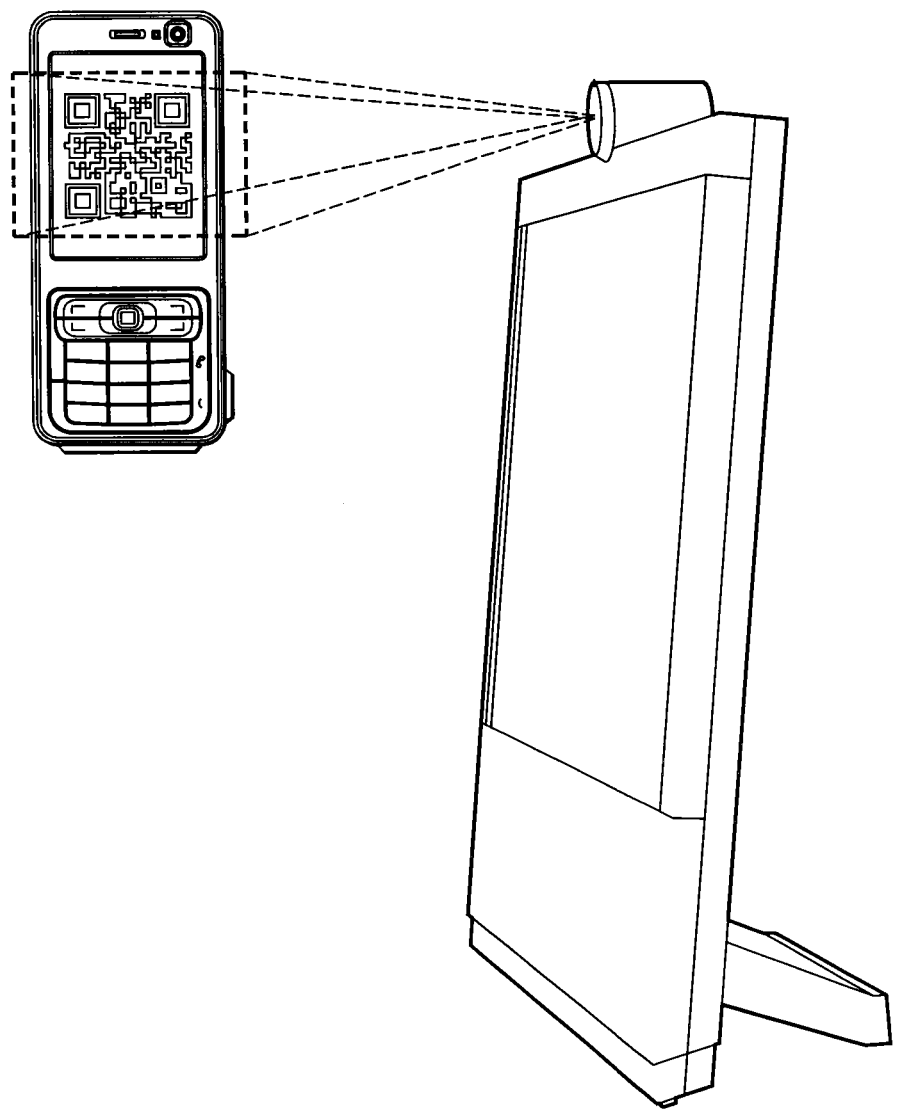
FIG. 5 is a schematic view further illustrating the method for transferring a collaboration session.

When the session is established between the first multimedia endpoint (e.g. EndpointY) and the handheld device, the first user (e.g. userY) and second user (e.g. userX) may communicate via audio and/or video while the second user (UserX) is looking for an unoccupied multimedia endpoint. Upon entering, for example, an empty meeting room with a second multimedia endpoint (e.g. EndpointZ), userX holds the handheld device in front of the second multimedia endpoint's camera (as illustrated in FIG. 5), such that the display of the handheld device faces the camera lens. An ID tag detection module of the second multimedia endpoint, which repeatedly checks the video stream for ID tags, detects that an ID tag is captured and decodes the data stored in the ID tag. Based on data from the ID tag and data stored in a memory of the ID tag detection module, the ID tag detection module sends an instruction to the CS 110. Alternatively, the endpoint may include a dedicated camera that reads the barcode.

The process proceeds to step S4, where an inquiry is made regarding whether a ID tag detection message is received by the CS 110 from an multimedia endpoint. If the response to the inquiry in step S4 is negative, the process returns to step S4. The barcode image detection message comprises a set of instruction parameters. The barcode image detection message parameters may comprise, but are not limited to, the address of the second endpoint (e.g. EndpointZ) that sent the message and the user name (or user ID) of the second user that initiated the instruction by showing the ID tag to the endpoint's camera. Optionally, the instruction may also identify the session ID of the session currently ongoing with the handheld device of the user. If the response to the inquiry in step S4 is affirmative, the process proceeds to step S5, where the SMM sends a session request to the second multimedia endpoint (e.g. EndpointZ), based on the received ID tag detection message and the message parameters. If the session request is accepted by the second multimedia endpoint (EndpointZ), the connection to the handheld device of the second user (e.g. UserX) is terminated, and a session between the first multimedia endpoint (e.g. EndpointY) and the second multimedia endpoint (e.g. EndpointZ) is established in step S5.

In one exemplary embodiment, the second multimedia endpoint is auto answer enabled such that the session request is automatically accepted by the second multimedia endpoint.

In another exemplary embodiment, the ID tag comprises data instructing the second multimedia endpoint to enable the auto answer feature for a one-time instance.

In another exemplary embodiment, the user must accept the call manually.

According to one exemplary embodiment, the CS 110 may use parts of the standard H.450.5 created by the International Telecommunications Union (ITU). H.450.x was created to define several Supplementary Services of the packet based telecommunication protocol known as H.323. H.450.5, also known as Park and Pick-up, facilitates session center services and terminal mobility. A user calling a call center is put into park mode until an agent is available for call pickup or a user can put a call into park mode at endpoint A and pick the call up at an endpoint B. The user is prompted a 4-10 digit access number which must be dialed/entered at the pickup endpoint. According to this exemplary embodiment, instead of parking the call, the CS 110 routes the call to the user's handheld device as described above, where the conversation continues uninterrupted. Simultaneously, the CS 110 codes the access number into an ID tag and sends it to the same handheld device, as described above. When the user finds a multimedia endpoint where he/she wishes to pick up the call, the user shows the ID tag to the multimedia endpoints camera, which in turn decodes the ID tag, retrieves the access number and send the access number to the CS 110. Upon receiving the access number from the endpoint, the CS 110 transfers the call to the endpoint that sent the access number.

Figure 6:
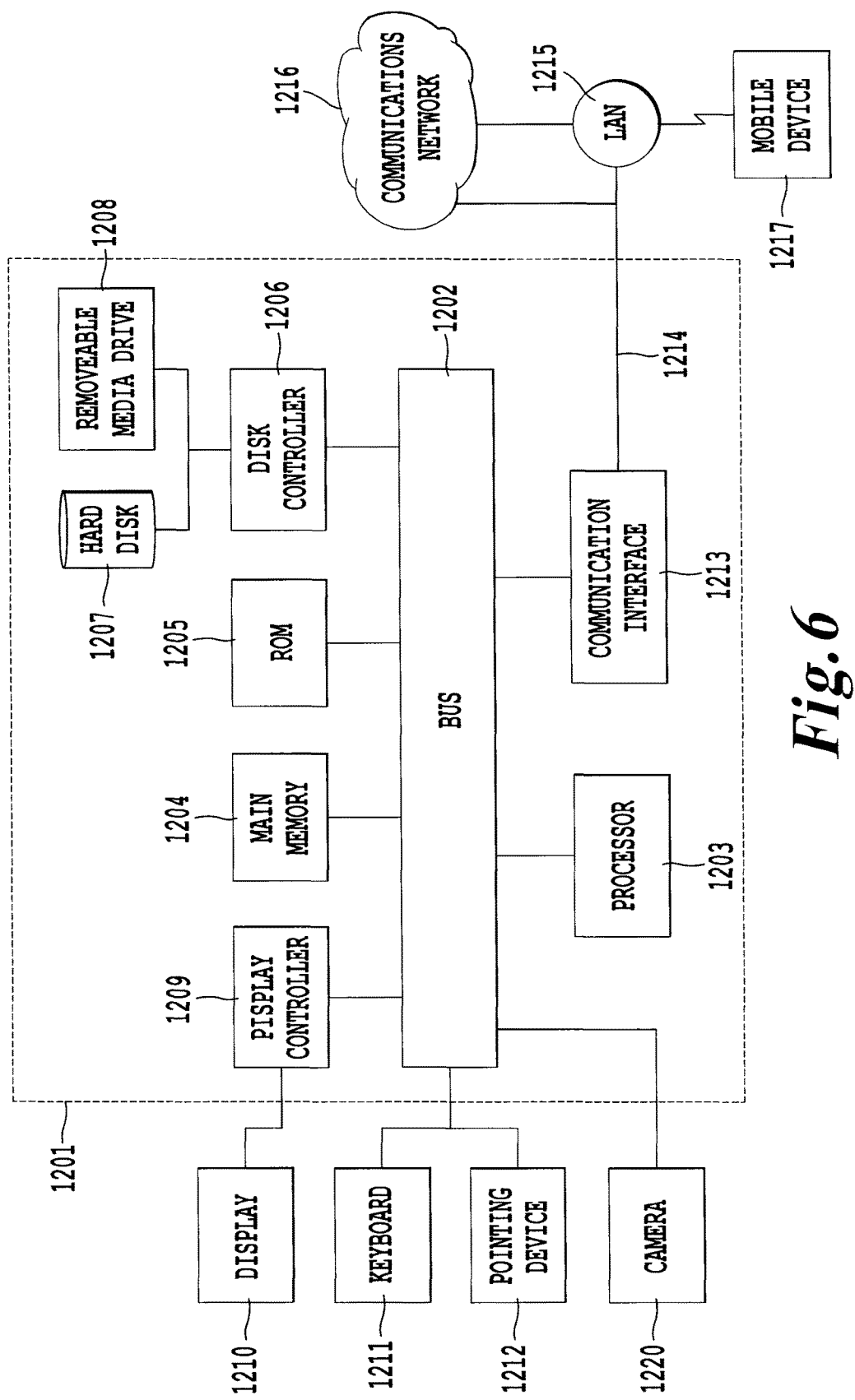
FIG. 6 is an exemplary computer system.

FIG. 6 illustrates a computer system 1201 upon which an embodiment of the multimedia endpoint. A person of ordinary skill in the art will recognize that certain of the hardware features shown in computer system 1201 are also included in the gateway, collaboration server, and handheld/mobile device. The endpoint, gateway, collaboration server, and handheld device will each be programmed to execute the functionality described above.

The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210.

The computer system 1201 performs a portion or all of the processing steps in response to the processor 1203 executing one or more sequences of one or more instructions contained in a memory, such as the main memory 1204. Such instructions may be read into the main memory 1204 from another non-transitory computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions.

As stated above, the computer system 1201 includes at least one non-transitory computer readable medium or memory for holding instructions programmed according to the teachings of the exemplary embodiments discussed herein and for containing data structures, tables, records, or other data described herein. Examples of non-transitory computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

Stored on any one or on a combination of non-transitory computer readable media, exemplary embodiments include software for controlling the computer system 1201, for driving a device or devices for implementing functionality discussed herein, and for enabling the computer system 1201 to interact with a human user. Such software may include, but is not limited to, device drivers, operating systems, development tools, and applications software.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed, the methods and systems described herein may be embodied in a variety of other forms. Elements from the various embodiments described herein may be combined together. Different embodiments do not mean that elements are not combinable or useable together. Furthermore, various changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method comprising:

receiving, at a collaboration server, a session request for a user identifier (ID), the session request initiated by a first multimedia device;

accessing a prioritized list of devices for the user ID;

attempting to establish a first collaboration session between the first multimedia endpoint and a second multimedia endpoint from the prioritized list of devices;

when the first collaboration session is not accepted by the second multimedia endpoint in a predefined time period, establishing a second collaboration session with a handheld device associated with the user ID from the prioritized list of devices, wherein the handheld device is at a lower priority than the second multimedia endpoint;

when the handheld device is in proximity of the second multimedia endpoint that did not accept the first collaboration session in the predefined time period, transferring the second collaboration session from the handheld device to the second multimedia endpoint, wherein transferring the second collaboration session comprises:

providing session data associated with the second collaboration session to the second multimedia endpoint and identification data for the handheld device by encoding session data into a code image and transmitting the encoded session data from the handheld device to the second multimedia endpoint, wherein the encoded session data is decoded at the second multimedia endpoint to obtain the session data for the second collaboration session and the identification data for the handheld device; and terminating the second collaboration session between the first multimedia endpoint and the handheld device after a replacement collaboration session has been established between the first and second multimedia endpoints using the session data obtained by the second multimedia endpoint decoded from the first multimedia endpoint.

2. A receiving multimedia device, comprising:

a camera;

short-range wireless communication circuitry; and control circuitry configured to receive a first request initiated by a sending multimedia device, from a collaboration server, including a user identifier (ID), wherein the first request is not accepted;

receive a second request, from a handheld device, the second request including encoded collaboration session data from a handheld device via the short-range wireless communication circuitry using near field communication (NFC) or Bluetooth protocol, decode the encoded collaboration session data to extract at least one of session data or an instruction, and send a detection message to a collaboration server when encoded session data is received and decoded, the detection message including at least parts of the session data and an address of the sending multimedia device, wherein when an establish session instruction is detected in the encoded session data, the control circuitry establishes a session with the sending multimedia device based on the session data using the decoded collaboration session data to establish the session.

3. The device according to claim 2, wherein the control circuitry is configured to enable an auto answer setting when an auto answer instruction is detected when the encoded session data is decoded, the auto answer setting cause the control circuitry to automatically answer an incoming call from the sending multimedia device.

4. The device according to claim 2, wherein, prior to the control circuitry establishing the session between the receiving multimedia device and the sending multimedia device, the session is established between the handheld device and the sending multimedia device, and the control circuitry is configured to:

transmit a message to the collaboration server to terminate the session between the handheld device and the sending multimedia device after the session is established between the receiving multimedia device and the sending multimedia device.

5. The device according to claim 2, wherein:

prior to the control circuitry establishing the session between the receiving multimedia device and the sending multimedia device, the session is established between the handheld device and the sending multimedia device, and the session data includes ID data to identify the session and/or a user associated with the handheld device.

6. The device according to claim 5, wherein the ID data includes a session ID of the session.

7. The device according to claim 5, wherein the ID data includes a user ID of the user associated with the handheld device and a session ID of the session.

8. A non-transitory computer readable medium including executable instructions, which when executed by circuitry, causes the circuitry to perform a method comprising:

receiving, at a collaboration server, a session request for a user identifier (ID), the session request initiated by a first multimedia device;

accessing a prioritized list of devices for the user ID;

attempting to establish a first collaboration session between a first multimedia endpoint and a second multimedia endpoint associated with a user;

when the first collaboration session is not accepted by the second multimedia endpoint in a predefined time period, establishing a second collaboration session between the first multimedia endpoint and a handheld device;

providing session data associated with the second collaboration session to the second multimedia endpoint by encoding session data into encoded session data and transmitting the encoded session data from the handheld device to the second multimedia endpoint by a code image, wherein the encoded session data is decoded at the second multimedia endpoint to obtain the session data, and the session data includes ID data to identify the first session and/or the user;

terminating the second collaboration session between the first multimedia endpoint and the handheld device after a replacement session has been established directly between the first and second multimedia endpoints using the session data obtained by the second multimedia endpoint; and creating a session database including a list of established collaboration sessions and a list of terminated collaboration sessions, wherein the established and terminated collaboration sessions have session parameters.

9. The non-transitory computer readable medium of claim 8, the method further comprising:

adding established collaboration sessions, or terminated collaboration sessions to the session database, as the sessions are established or terminated.

10. The non-transitory computer readable medium of claim 8, wherein the session parameters include a session ID, an endpoint number corresponding to the session, and user identifications of the parties in the session.

11. The device according to claim 7, further comprising:
a session management database, wherein the session management database stores the user ID and the session ID.

12. The device according to claim 11, further comprising:
adding the session data to the session management database.

13. The non-transitory computer readable medium of claim 8, further comprising:
creating a session database, wherein the session database includes session data.

14. The non-transitory computer readable medium of claim 13, further comprising:
adding session data corresponding to an established session to the session database after establishing the session.

* * * * *